United States Patent [19]

Lin

[11] Patent Number: 5,003,578

[45] Date of Patent: Mar. 26, 1991

[54] POWER-SAVING DEVICE FOR A CABLE-INFORMATION RECEIVING/TRANSMITTING APPARATUS

[76] Inventor: Den K. Lin, 2 Fl., No. 127-1, Hu Lin St., Taipei, Taiwan

[21] Appl. No.: 392,787

[22] Filed: Aug. 11, 1989

[51] Int. Cl.$^5$ .................................... H04M 11/00
[52] U.S. Cl. .................................. 379/90; 379/102; 379/100
[58] Field of Search ............... 379/90, 110, 377, 379, 379/413, 373, 65, 66, 102

[56] References Cited

U.S. PATENT DOCUMENTS

| | | | |
|---|---|---|---|
| 3,412,213 | 11/1968 | McCay | 379/376 |
| 4,465,903 | 8/1984 | Barber | 379/90 |
| 4,647,721 | 3/1987 | Busam et al. | 370/102 |
| 4,656,318 | 4/1987 | Noyes | 379/93 |
| 4,700,380 | 10/1987 | Ahuja | 379/177 |
| 4,701,946 | 10/1987 | Oliva et al. | 379/98 |
| 4,907,249 | 3/1990 | Nebel | 375/104 |

Primary Examiner—Jin F. Ng
Assistant Examiner—Stella L. Woo
Attorney, Agent, or Firm—Poms, Smith, Lande & Rose

[57] ABSTRACT

A power saving device for a cable-information receiving/transmitting apparatus, for example, a facsimile machine or a computer. The device allows no AC power to be supplied to the apparatus during the stand-by time thereof. When ring signals arrives, or when the user picks up the handpiece of a telephone set attached to the apparatus, the Ac power supply is started. When the reception or transmission of information is over, the Ac supply is cut off after a predetermined time, thus allowing the after-reception work or after-transmission work to be finished. This device mainly comprises a relay (1) [or a SCR (1a)], a transistor (T), an optical coupler (3) [preferably consisting of a LED (31) and a CdS photoresistor (32)], and a tapping/rectifying circuit (2). It can totally eliminate the undeserved waste due to the consumption during the stand-by time.

9 Claims, 5 Drawing Sheets

POWER-SAVING DEVICE FOR A CABLE-INFORMATION RECEIVING/TRANSMITTING APPARATUS

The present invention relates to a power-saving device for a cable-information receiving/transmitting apparatus, in particular for a facsimile machine, to minimize the power consumption of the latter by eliminating the consumption during its stand-by time without thereby affecting the normal functions thereof.

Such apparatus, for example, a facsimile machine or a computer, must always be kept in stand-by (or ready-to-work) state so as to be prepared for the sporadic arrivals of information without missing any of them. (Here the term "stand-by" means that the power line of the apparatus is connected to a power supply, but no information is being transmitted or received.) To keep the apparatus in stand-by state, a considerable amount of electric power is consumed (though not so much as what is consumed during the reception or transmission of information, when all parts of the apparatus are working). As a result, the total waste of power during the stand-by time is noticeable. For the currently used models of facsimile machines, the consumption is about 15–50W.

Accordingly, it is the main object of this invention to provide a power-saving device which minimizes the AC power consumption of a cable-information receiving/transmitting apparatus (in particular a facsimile machine) by totally eliminating the AC power consumption during the stand-by time.

To save the AC power consumption, it is necessary to start the AC power supply of a local facsimile machine or cut off it in the correct moment. In other words, in the case of reception of information from another (a remote) facsimile machine, the AC power supply must be started during the arrival of information, and be cut off shortly after the reception of information is over. In the case of transmission of information to another (a remote) facsimile machine, the AC power must be started when the user does the first step of transmission procedure (for example, when he picks up the handpiece of the telephone set attached to the local facsimile machine), and be cut off shortly after the transmission of information is over. (Note: the power supply should not be cut off immediately, but shortly after the end of the reception or transmission of information. The reason will be explained later.)

To achieve this object, a power saving device must be responsive to various states. In other words, in the case of the reception of information, the device must be responsive to the arrival of an incoming transmission (Note: here we use the term "incoming transmission" instead of "information" because the central office always sends "ring signals" in advance before sending information to the local facsimile machine.) and the end of the reception of information. On the other hand, in the case of the transmission of information, the device must be responsive to the picking-up of the handpiece and the end of the transmission of information.

A known device was developed to reduce the AC power consumption of a facsimile machine during its stand-by stage. But it is not altogether satisfactory because it only "reduces" and does not "totally eliminate" the AC power consumption during the stand-by time. Before explaining the reason of its imperfection, let's look at some well-known facts in facsimile transmission.

When a local facsimile machine X is receiving information from another (a remote) facsimile machine Y, the central office will send ring signals to X in advance if X is in ON-HOOK state. The state of X is immediately (and automatically) changed from ON-HOOK to OFF-HOOK state upon reception of the ring signals. Then the central will perceive the OFF-HOOK state of X and sends information from Y to X. When the reception of information is over, the facsimile machine immediately returns to ON-HOOK state. If X is to transmit information to Y, when the user picks up the handpiece of X, the state of X immediately changes from ON-HOOK to OFF-HOOK. Once the transmission of information is over, the state of X immediate returns to ON-HOOK state.

The known device uses a known "off-hook detector" to respond to the various states. The OFF-HOOK detector is always detecting the state of the local facsimile machine provided with this known device. Also, as a matter of fact, the ON/OFF of the AC power source is controlled by a relay. Referring to FIG. 1, the known device comprises, apart from the OFF-HOOK detector and relay, a controlling circuit interposed therebetween. The controlling circuit receives the output signal from the OFF-HOOK detector and controls the ON/OFF of the relay. During the arrival of an incoming transmission, the OFF-HOOK detector will perceive the OFF-HOOK state of the facsimile machine and gives corresponding signal to the controlling circuit, which in turn, switches on the relay to start the AC power supply. When the reception of information is over, the OFF-HOOK detector immediately perceives the ON-HOOK state of the local facsimile machine, and gives a corresponding signal to the controlling circuit to switch off the relay, and therefore the AC power supply after a predetermined time. Likewise, when the user picks up the handpiece of the local facsimile machine, the OFF-HOOK detector immediately perceives the OFF-HOOK state thereof, and the AC power supply is started. When the transmission of information is over, the OFF-HOOK detector immediately perceives the ON-HOOK state, so the AC power supply is cut off after a predetermined time.

Thus it is the OFF-HOOK detector that enables the AC power supply to be started or cut off in the correct moments. But it is also the OFF-HOOK detector that results in the imperfection of the known device. The reason is simple. As stated before, the OFF-HOOK detector must "always" detect the state of the facsimile machine. Since the OFF-HOOK detector itself needs a basic AC power to drive its circuit, it is always consuming AC power, even in the stand-by time. As a result, the device can only reduce, but not totally eliminate the AC power consumption during the stand-by time.

The present invention is directed to totally eliminating the AC power consumption during the stand-by time.

As a matter of fact, on ON/OFF of AC power is control by a relay, as in the aforesaid device, or alternatively, by a thyristor (preferably a SCR). Both are well known elements in controlling the ON/OFF of AC power.

To activate the relay or the SCR, and also to maintain it in ON state, a DC current or a positive bias must be applied (and then kept on being applied) to the coil of the relay or to the gate of the SCR during (and only during) the working state (and not during the stand-by stage) of the local facsimile machine. In the known device, the controlling circuit supplies the requisite DC current to the relay when the OFF-HOOK detector perceives the OFF-HOOK state of the local facsimile machine, and the required DC is interrupted short after the detection of the ON-HOOK state thereof. Since the OFF-HOOK detector consumes AC power supply, this invention involves no OFF-HOOK detector, and provides a circuit which consumes no AC power during the stand-by time.

Once the relay or the SCR is activated and the AC power supply is thus started, it would be very easy to "tap" an AC current from the AC output of the relay or the SCR and to rectify the tapped AC current into a DC current, then apply the DC current to the coil of the relay or the gate of the SCR to keep the relay or the SCR in ON state. But the problems are, how to activate the relay or the SCR when the relay or the SCR is in OFF state and no such current is available, and how to deactivate the relay or the SCR when the relay or the SCR is in ON state and a current is continuously applied to the coil of the relay or to the gate or the SCR?

To solve this problem, the device according to this invention utilizes a transistor, of which the collector-emitter (CE) path is in serial connection with the coil of the relay or connected to the gate of the SCR, and of which the base is in serial connection with a transistor-controlling element which is activated when the facsimile machine becomes OFF-HOOK and which becomes inactive immediately when the facsimile machine becomes ON-HOOK. Thus when the facsimile machine receives ring signals from the central office or when its handpiece is picked up, the transistor-controlling element is activated, and a current can pass through the transistor-controlling element and be applied to the base of the transistor, which is then conducted to allow a further current to flow through the coil of the relay and the transistor or through the transistor and be applied to the gate of the SCR, thus switching on the AC power supply. It is noteworthy that before the starting of the AC power supply, the required current (which flows through the transistor-controlling element and applied to the base of transistor, and which flows through the coil and the CE path, or through the CE path to the gate of the SCR) still has to be taken from the AC power supply. Since this current is taken before the activation of the relay or SCR, it must be taken from an upstream spot of the relay or SCR (i.e. in front of the AC input of the relay or the A terminal of the SCR) and not from a downstream spot thereof (i.e. behind the AC output of the relay or the K terminal of the SCR), so that the current can be taken even if the relay or SCR is in inactive state. To take such a current from the AC power supply and rectify it into a useful DC current, a tapping/rectifying circuit is provided.

In stand-by state, the transistor-controlling element is not conducted, thus this current cannot flow through the transistor-controlling element to actuate the transistor, and therefore the relay or SCR. Once the transistor-controlling element becomes conducted, this current can flow from the tapping/rectifying circuit through the transistor-controlling element and applied to the base of the transistor, thus activating the latter. Then the tapped current can further flow through the coil of the relay (or be applied to the gate of the SCR) and keep the relay (or SCR) in activated state. This current keeps on supplying the transistor-controlling element and the transistor as well as the coil of the relay (or the gate of the SCR) until the transistor-controlling element becomes inactive again.

The transistor-controlling element itself is further controlled by a transistor-controlling-element controlling element (hereinafter referred to as TCE-controlling element) which is only accessible by the cable current but not by the tapped current. Thus, once the reception or transmission of information is over, the TCE-controlling element itself can become inactive due to the change in the cable despite the fact that the tapped and rectified current is still supplying the transistor and the transistor-controlling element. The inactivation of the TCE-controlling element causes the transistor-controlling element to become non-conductive, thus the tapped and rectified current can no longer be supplied to the base of the transistor, which therefore becomes non-conductive too, thus the relay or SCR is inactivated. In so doing, the aforesaid problems are solved.

Practically, the aforesaid TCE-controlling element and the transistor-controlling element are respectively an optical emitter and an optical receiver which, together make an optical coupler. Preferably the TCE-controlling is a LED (though it can also be a bulb), and the transistor-controlling element is a CDS photoresistor (though a photodiode, a photo-transistor or a photocell can also be used). It is found that only an optical coupler can achieve satisfactory control of the AC power supply. If we used other elements to replace the optical coupler (for example, a reed or a DIAC-TRIAC set) the result will be inferior.

It is noteworthy that in stand-by state, the connection between the central office and the local facsimile machine (now in ON-HOOK state) is not built. Once the facsimile machine becomes OFF-HOOK, the connection will be built and information can be transmitted from the central office to the local facsimile machine or vise versa. In other words, the connection is built in two cases: When the user picks up the handpiece of the local facsimile machine, or when the local facsimile machine receives ring signals from the central office (Both cases lead to the OFF-HOOK state of the facsimile machine.). Once the connection between the local facsimile machine and the central office is built, the LED can be supplied by the current from the cable, thus maintaining all related elements (the CDS photoresistor the transistor, and the relay or SCR) in active state.

In stand-by state, the potential at the cable terminal of a facsimile machine is 48 V. During the presence of ring signals, the potential slightly increases (to about 56 V) and the polarity is inverted. Then during the reception of information, the polarity is recovered, but the potential falls to 6–7 V. It is not until the reception is over that the potential recovers to 48 V. This phenomenon is well-known to anyone skilled in the field of telecommunication.

In order to ensure the cable current to flow always in the forward direction of the LED, a rectifying circuit is provided. (This rectifying circuit is not to be confused with the aforesaid tapping/rectifying circuit!) If a bulb, which has no polarity is used instead of a LED, the rectifying circuit is not necessary. But a LED is more preferred.

Therefore, the power-saving device of this invention basically comprises an AC-controlling element (a relay or a thyristor), a tapping/rectifying circuit, a transistor, an optical coupler (preferably consisting of a LED and a CdS-photoresistor), and, if necessary, a rectifying circuit.

Theoretically, the AC power supply can be immediately cut off after the end of a reception or a transmission of information, but in actual use, this is not the case. A facsimile machine still has some after-reception work or after-transmission work to do after the reception or transmission of information. For example, it must give a confirmation of safe receipt to the remote facsimile machine which sent information to it, or make sure if the transmitted information is safely received by the remote facsimile machine. The necessary work is generally finished within 20 seconds and requires AC power. For this reason, the AC power cannot be immediately cut off when the reception or transmission of information is over. For this purpose, a capacitor is provided to delay the switching-off of the AC power supply. Practically, the capacitor is in parallel connection with the coil of the relay or the BE route of the transistor (when SCR is used). When the reception or transmission of information is over, the capacitor starts to discharge until its potential reaches a lower value. The discharge causes a current to flow through the coil of the relay or to the gate of the SCR. Thus the relay or the SCR can remain in ON state for a predetermined time, which depends on the capacitance of the capacitor.

The capacitor must have a definite polarity, and is preferably an eletrolytic capacitor. The reason will be explained later.

It is preferred that the device of this invention can be directly applied to a facsimile machine without modifying the structure thereof. Practically the device has a socket into which the plug of the power line of a facsimile machine can be inserted, and two (or three) pins defining a plug to insert into a socket of a power source. Since the device also involves the transmitted signals in the cable, it must respectively be connected to a cable from the central office and the cable of the facsimile machine. Therefore, this device also has a first jack (or first terminal set) to connect with the cable from the central office (telephone cable) and a second jack (or second terminal set) to connect with the cable of the facsimile machine. Thus, when one applies this device to an ordinary facsimile machine, one only needs to connect the telephone cable and the cable of the facsimile machine respectly to the first and the second jacks, and then insert the plug of the power line of the facsimile machine into the socket of the device and insert the pins of the device into a socket of an AC power source. In so doing, a conventional facsimile machine can be easily converted into a power-saving facsimile machine without modification of its structure.

This invention will be better understood when read in connection with the drawing, in which three different practical embodiments are shown. In the first and second embodiments, a relay is used, while in the third embodiment, a SCR is used to control the AC power supply. In the first and third embodiments, the power-supply-side circuit and the cable-side circuit are isolated from each other, but in the second embodiments, they are connected with each other. In these embodiments, like references designate like elements.

DETAILED DESCRIPTION OF PREFERRED EMBODIMENTS

Figure 1:
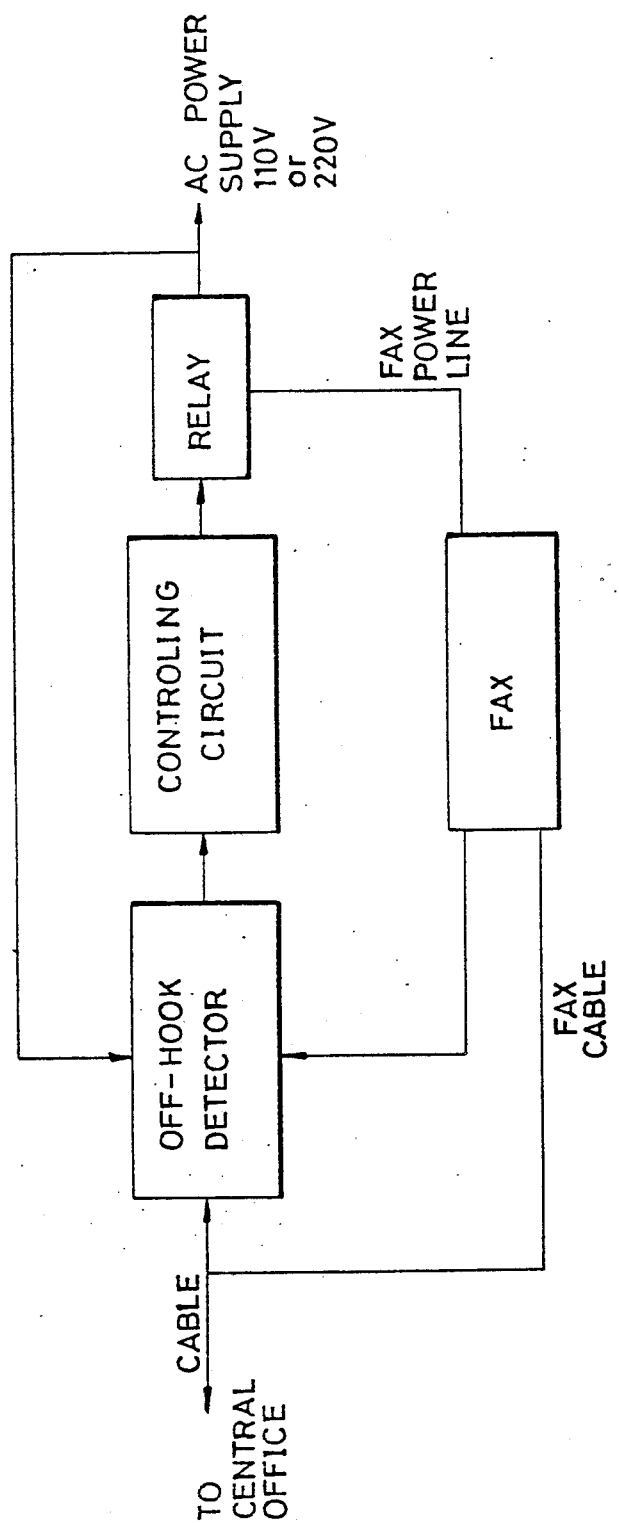
FIG. 1 is a block diagram of a conventional power-saving device for facsimile machines involving an OFF-HOOK detector.
Figure 2:
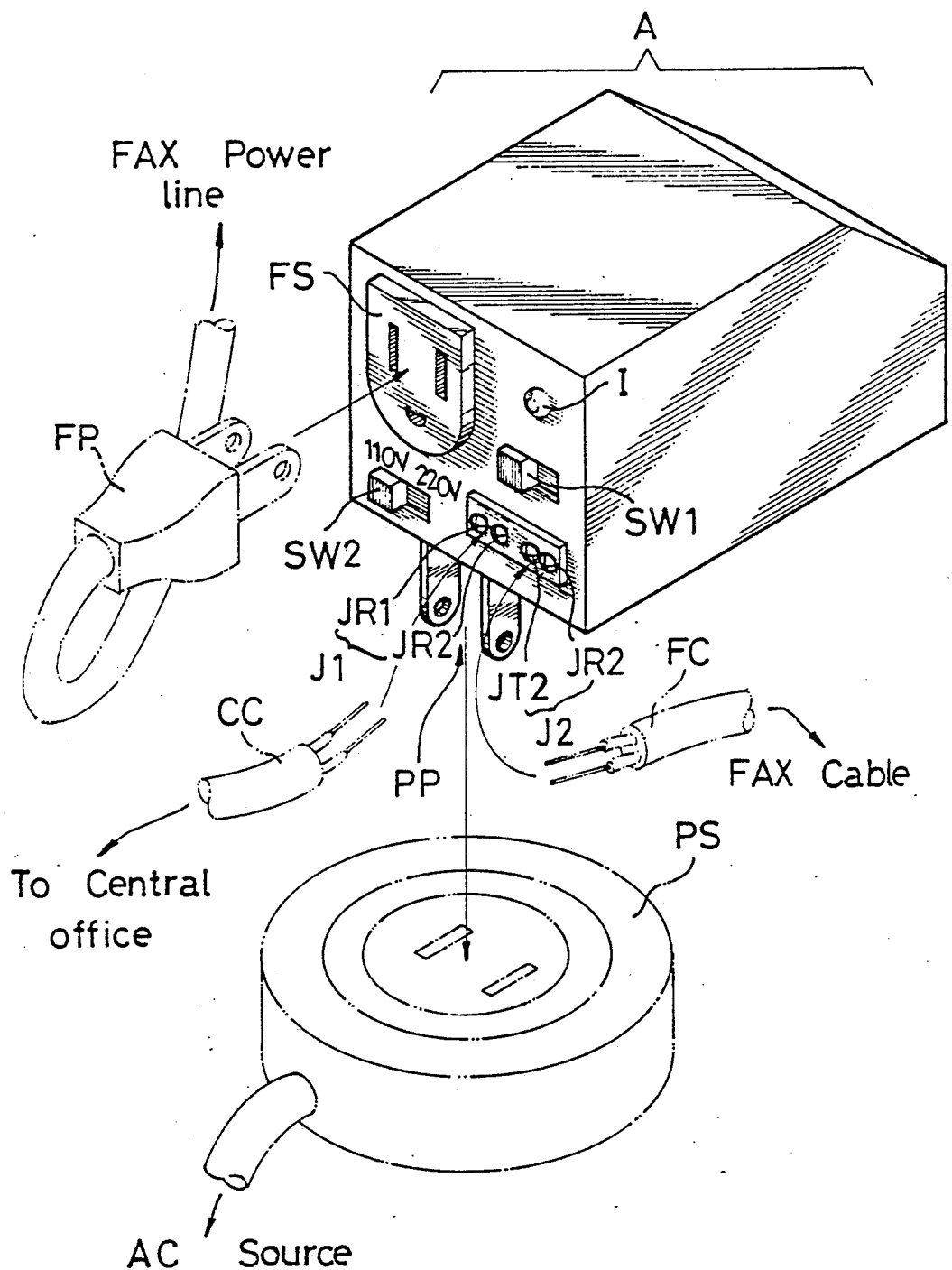
FIG. 2 is a perspective view showing a device according to this invention and the terminals with which it is to be connected.

Referring to FIG. 2, the present invention is practically made in form of an adapter A which has two pins defining a power plug PP to insert into a socket PS of AC power supply, a socket FS for the plug FP of a power line of an ordinary facsimile machine (not shown), a first jack (or terminal set) J1 for a cable CC to the central office, a second jack (or terminal set) J2 for a cable FC of the facsimile machine. An indicator light I can be provided to indicate whether or not the AC power supply is switched on. Two switches SW1, SW2 can be optionally provided. Their functions will be stated later.

It is to be announced that in the first and the third embodiments, the polarity of the cable terminals is of no importance. In other words, the user need not carefully connect the positive and negative terminals of the jack J1 and jack J2 to the corresponding positive and negative terminals of the cable terminals of the cables CC and FC. But in the case of the second embodiment, the terminals of like polarity must be connected with each other. The reason will be explained later.

Figure 3:
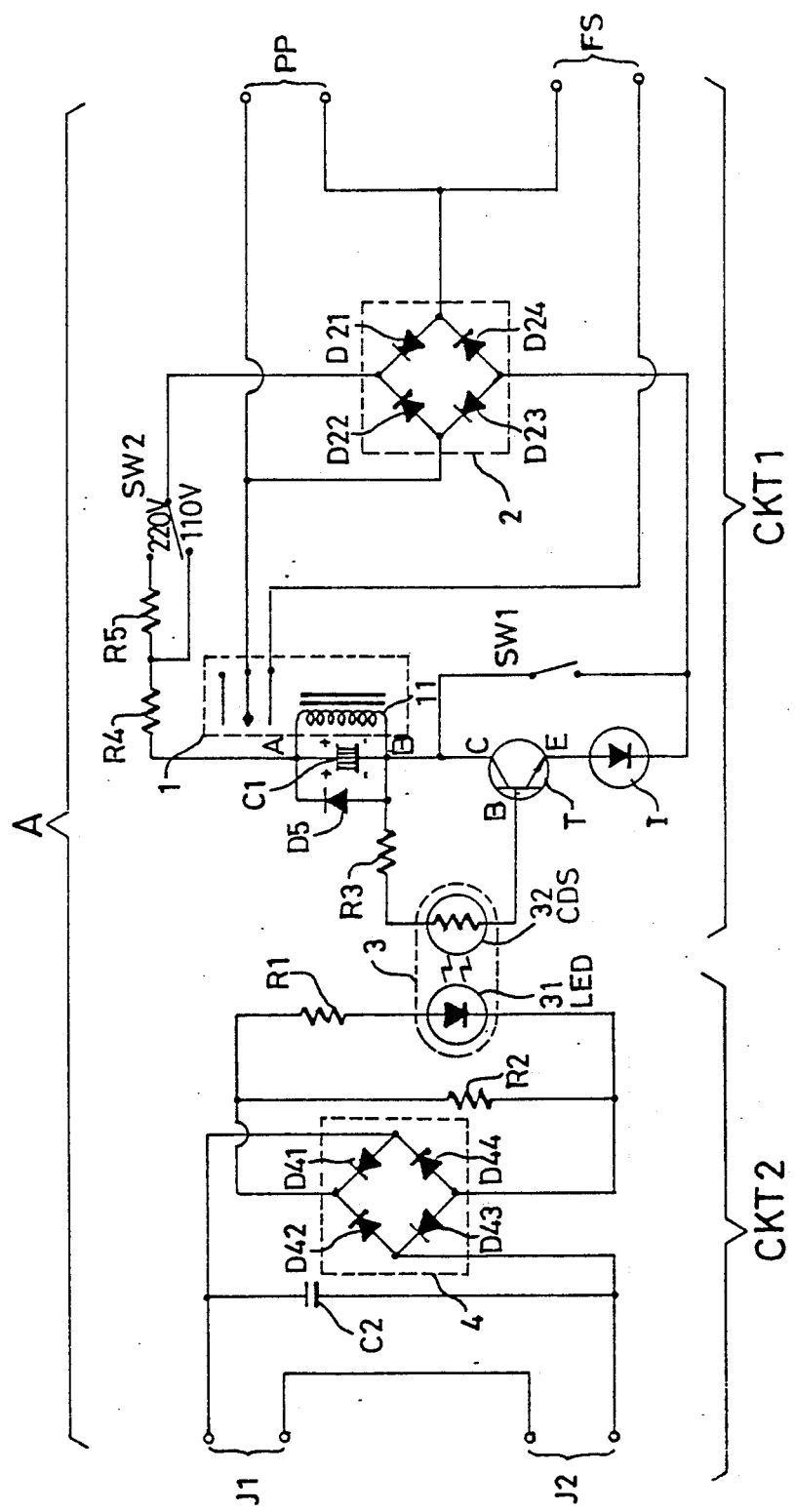
FIG. 3 is a circuit diagram of a first embodiment of this invention.

Referring to FIG. 3, the device A basically comprises, as stated before, a relay 1, a tapping/rectifying circuit 2 with four diodes D21, D22, D23, D24, a transistor T, an optical coupler 3 including a LED 31 and a CdS photoresistor 32, a rectifying circuit 4 including four diodes D41, D42, D43, and D44, and a capacitor C1. As stated hereinbefore, in this embodiment, the power-supply-side circuit CKT1 and the cable-side circuit CKT2 are isolated from each other. Their connection is only via the LED-CDS optical coupling.

The function of the device in various states of the facsimile machine (i.e. during the reception and transmission of information, or used as a photocopier) is described in the following:

A. RECEPTION OF INFORMATION

In stand-by state, the connection between the facsimile machine and the central office is not built, thus the cable-side circuit CKT2 is not supplied by the cable CC, and the LED, [and therefore, the CDS photoresistor 32 resistor, the transistor T, and the relay 1] are all in inactive state. Thus no AC power is supplied to the facsimile machine. The potential at the terminals of jack J1 is 48 V.

If a remote facsimile machine dials the number of the local facsimile machine, the central office, which is always detecting the state of all the telephones and facsimile machines in its territory, will make different response depending on the state of the local facsimila machine. If the local facsimile machine is found to be busy (i.e. it is receiving or transmitting information), of course its power supply must have been started. Therefore the equipped local facsimile machine makes no difference with an ordinary facsimile machine without the device of this invention in this busy state, and a statement is not necessary.

If the local facsimile machine is not busy (i.e. in ON-HOOK state) the central office will send ring signals to the local facsimile machine, and the polarity of the terminals of jack J1 is inverted. As stated before, in this embodiment the polarity of the terminals of jack J1 is no importance, thus the ring signals may travel from either terminal of jack J1 via the rectifying circuit 4 to point P11 and then through the LED and diode D43 to the facsimile machine. When the ring signal passes through the LED, 31 the latter lights up, thus activating the CDS photo-sensitive resistor 32.

Once the CdS photoresistor 32 becomes conductive, a tapped current can flow through diode D21, switch SW2 [if this switch is provided], the coil 11 of relay 1, and the CdS photoresistor 32 and applied to the base of the transistor T, thus actuating the transistor T. As a result, the tapped current can also flow through the CE path of the transistor T, and therefore the coil 11 of relay 1, thus starting the AC power supply.

After actuating the relay, the tapped current keeps on flowing from the tapping/rectifying circuit 2 and to the CdS photoresistor 32 and the transistor T to provide the required current flowing through the coil 11 to keep the relay 1 in activated state. The tapped current occupies only a negligible portion of the AC power, which is mostly supplied via the AC output of the relay to the facsimile machine.

When ring signals enters the facsimile machine, the latter immediately changes from ON-HOOK to OFF-HOOK state, which is immediately perceived by the central office. Thus the central office stops sending out ring signals, and builds up its connection with the local facsimile machine. Now information can be transmitted from the remote facsimile machine to the local facsimile machine. Meanwhile the polarity of the terminals of jack J1 recovers, and the potential falls to 6-7 volts. Since the connection between the central office and the facsimile machine has been built, the cable-side circuit can be supplied via the cable CC to maintain the LED in activated state. Now information can travel from J1 directly to J2 or through the rectifying circuit to J2 and enter the facsimile machine, depending on the polarity of the two terminals of J1.

When the reception is over, the facsimile machine becomes ON-HOOK again, and the connection between the central office and the facsimile machine is broken. The potential at the jack J1 recovers to 48 V. Now the cable-side circuit is no longer supplied via the cable, so the LED 31 immediately becomes inactive. the inactivation of LED results in the inactivation of the CdS photoresistor 32 and the transistor T. Thanks to the capacitor C1, which starts to discharge at this moment to delay the switching-off of the relay for 40-50 seconds, thus allowing the after-reception work to be finished.

In stand-by state, the potential difference between the two electrodes of the capacitor C1 is 0 volts, thus no current can flow from its positive electrode to its negative electrode, and the relay remains inactive. Once the relay is activated, the power-supply side circuit CKT1 is supplied by the tapped and rectified current which has a voltage of 110 V or 220 V. Thus the capacitor C1 is charged by the tapped current to 110 V or 220 V. At his moment, the potential in the circuit CKT1 is also 110 V or 220 V, hence no charge can flow from the positive electrode of to the negative electrode of the capacitor C1. When the reception of information is over, the LED, CdS photoresistor 32 and transistor T become inactive, and the potential in the circuit CKT1 falls to 0 volts, thus allowing a current to flow from the positive electrode of capacitor C1 through coil 11 to the negative electrode thereof. The potential difference between the two electrode gradually falls. When the potential difference falls below a value (for example, about thirty volts), the current becomes too weak to keep the relay in active state, so the AC power supply is cut off. But the capacitor C1 still continues to discharge until the potential difference between its two electrodes approaches 0 volts.

B. TRANSMISSION OF INFORMATION

If the user picks up the handpiece, the connection between the local facsimile machine and the central office is built, thus the cable-side circuit CKT2 is supplied via the cable, and the LED 31 is actuated, which in turn, causes a chain reaction of the activation of the CdS photoresistor 32, transistor T, and raley 1, thus the AC power supply is started. Meanwhile the local facsimile machine changes from ON-HOOK to OFF-HOOK state. When the user dials the fax number of the remote facsimile machine, if the latter is not busy, the central office will build up the connection between the central office and the remote facsimile machine. Now, information can be transmitted from the local facsimile machine via the central office to the remote facsimile machine. The information may travel from jack J2 directly to jack J1 or through the rectifying circuit 4 to jack J1, depending on the polarity of the terminals of J2. When the transmission of information is over, the state of the facsimile machine changes from OFF-HOOK back to ON-HOOK, and the central office will perceive the ON-HOOK state of the local facsimile machine, and the connection between the local facsimile machine and the central office is broken. Now the cable-side circuit is no longer supplied via the cable, and the LED becomes inactive. This results in the inactivation of the CdS photoresistors 32 and the transistor. Here too, thanks to the capacitor C1, the inactivation of the relay is delayed by 40-50 seconds so that the facsimile machine can still be energized to finish the after-transmission work.

C. USED AS A PHOTOCOPIER

Some of the models of facsimile machines can be used as a photocopier for xeroxographic duplication purpose. In such case, a facsimile machine provided with this invention can only be supplied with AC power when the user picks up the handpiece and keeps it away from the hook during the duplication. This is not desirable. In order to start the power supply without picking up the handpiece, the best way is to "short-circuit" the power-supply-side circuit CKT1, so that a current can pass through the coil 11 without passing through the transistor T. In so doing, the power supply is always in switched-on state regardless of the state of the trasistor T. For this purpose, a normally open switch SW1, which is in parallel connection with the transistor T, is provided. When the local facsimile machine is used as a photocopier, the user only need to switch SW1 to its ON (close) position, and the power supply will be started.

Now the functions of the major elements of the device has been described in details. Some minor elements of the first embodiment are described in the following.

As a matter of fact, a resistor R1 is connected in series with the LED 31 to protect the latter.

To further protect the LED, another resistor R2 is connected in parallel to limit the current flowing through the LED 31.

To facilitate information (which are alternating signals) to pass through the cable side circuit CKT2, a capacitor C2 is provided, so that information can travel from J1 to J2 or vise versa directly or merely via the capacitor C2 without passing through the more difficult resistors R1, R2, LED and reactifying circuit 4, thus the loss in intensity of the signals in the rectifying circuit can be minimized. The capacitor C2 is used to provide a shunt for the signals, not for storage purpose. Since the polarity of the terminals of jack J1 is inverted during the presence of ring signals, the capacitor C2 should not have definite polarity.

In contrast, the capacitor C1 is used for storage purpose. Thus it is should have a definite polarity and is preferably an electrolytic capacitor (Since in the case of electrolytic the required capacitance can be smaller). But this is not its exclusive function. The capacitor C1 can also stabilize the relay during the presence of ring signals. When ring signals arrives, the power-supply-side circuit is not yet supplied by a tapped rectified current, and thus the voltage therein is not stable. Since the ring signals are pulses, which may cause the pulsative activation of the LED, and therefore the pulsative activation of the CdS photoresistor, of the transistor and of the relay, thus resulting in the "rattling" of the relay. With the capacitor C1 the undesired pulsation can be absorbed. To adapt to different voltages of AC power source (for example 110 V or 220 V), there is provided a selector switch SW2 in the power-supply-side circuit CKT1.

The functions of the first embodiment has been explained in detailes. The second embodiment will be further discussed in he following.

Figure 4:
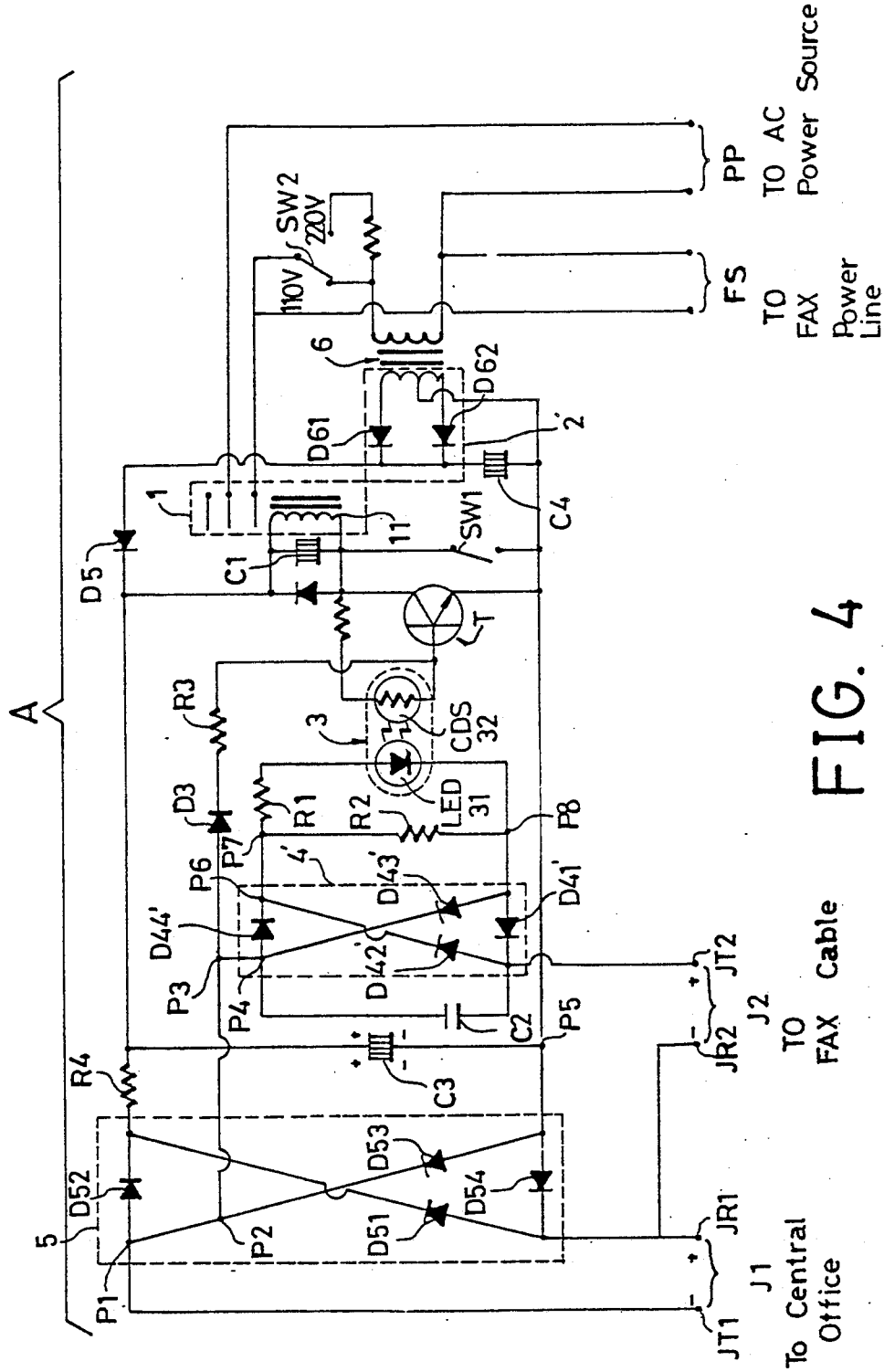
FIG. 4 is a circuit diagram of a second embodiment of this invention.

Referring to FIG. 4, like the first embodiment, this variants also comprises the major elements such as a relay 1, tapping/rectify circuit 2', a transistor T an optical coupler 3 consisting of a LED 31 and a CdS photoresistor 32, and a capacitor C1. Apart from the major elements, this variant also comprises like minor elements such as resistors R1 and R2, switches SW1 and SW2, a rectifying circuit 4' and a capacitor C2. Since the functions of all these elements are the same as or similar to that in the first embodiment, their detailed description is not necessary. The function of tapping-/rectifying circuit 2' is similar to that of the tapping circuit 2 in FIG. 3. Likewise, the function of the rectifying circuit 4' is similar to that of the rectifying circuit 4 in FIG. 3 . But in this embodiment, the cable-side circuit and the power-supply-side circuit are not isolated (The reason will be explained later). Therefore it is necessary to ensure that the tapped current cannot get access to the LED. For this purpose a second rectifying circuit 5 is provided. But this is not the only function of the second rectifying circuit 5. The reason will be explained later.

In view of a fact that in some remote areas, the ring signals may be too weak and may be insufficient to activate the LED 32, an auxiliary circuit comprising a diode D3 and resistor R3 is provided. Thus in the presence of ring signals, a portion of the ring signals can flow through this auxiliary circuit and directly applied to the base of the transistor. Thus, even through the ring signals applied to the LED is not sufficient to light it up, the transistor T can still be ensured to become conductive.

In the first embodiment the tapped current is directly applied to the coil 11, CdS photoresistor 32 and transistor T without transformation. Hence the voltage of the tapped current is alo 110 V or 220 V. Accordingly, the elements 11, 32 and T must be able to withstand such high voltage, thus necessitating a relatively high cost. In the second embodiment, a transformer 6 is provided to reduce the voltage of the tapped current to 48 V, so that the required specification of these elments 11, 32 and T is not so critical, and the cost of production can be reduced.

The use of a transformer causes another problem. It is well known that even if the second winding of a transformer is open-circuit, if its primary winding is close-circuit, a certain consumption of power is still inevitable. For this reason, the primary circuit of the transformer must be connected to the relay and kept normally open. In so doing, the consumption of the primary winding of the transformer during stand-by-time is avoided.

But another problem arises. In the first embodiment, the required current to drive the elements 32, T and 1 is taken from the AC power source. If even the primary circuit of the transformer is open, such a current will not be available.

To solve this problem, a third capacitor C3 is provided which provides a current to drive these elements 32, T and 1, in the early stage of a working cycle (i.e. during the appearance of ring signals, or when the user picks up the handpiece). Once the relay is activated, a current can be tapped from the transformer 6 via the tapping/reactifying current to drive these element 32, T and 1, so the capacitor C3 no longer need to supply this current.

The capacitor C3 must have a definite polarity to ensure the current to flow in the forward direction of the transistor T. It is preferably an electrolytic capacitor. The reason is the same as why the capacitor C1 is preferably an electrolytic capacitor.

It is necessary to allow the current from the cable CC to flow to the capacitor C3 in definite direction so as not to counterbalance the stored charge thereof during the inversion of the polarity at the terminals JR1. JT1. This avoidance is also achieved by the second rectifying circuit 5.

When the device is connected to the facsimile machine, a tlephone cable and a power supply, the capacitor C3 is charged from 0 to 48 V by the 48 V potential at the terminals R1, JT1 and then always kept at this value. The charging route in stand-by state is as follows: from terminal JR1 via diodes D51, resistor R4 (of which the function will be stated later) to the capacitor C3 and then via diode D54 to terminal JT1.

In this embodiment, ring signals can only reach the transistor from terminal JT1, but not from terminal JR1. Therefore it is necessary to correctly connect the terminals R1, JT1 to the current terminals of the cable CC of like polarity.

Since the capacitor C3 must be charged by the cable, it must be connected to the cable-side circuit. Also, since capacitor C3 is used to supply the elements 32, T and 1, it must be connected to the power-supply-side circuit. For this reason, the cable-side circuit and power-supply-side circuit may not be isolated with each other.

Therefore the second embodiment comprises a transformer 6, a second reactifying circuit 5 and a third capacitor C3 [and probably also an auxiliary circuit D3, R3] which are absent in the first embodiment.

In stand-by time, the polarity at the terminals of jack J1 is JR1 (+) and JT1 (−), and the potential is 48 V.

When ring signals arrives, the polarity is inverted to JR1 (−) and JT1 (+). The ring signals can travel from JT1 to the LED 31 and the elements 32, T and 1. But we cannot utilize the ring signals to drive the elements 32, T and 1 without using the capacitor C3. If we do so, a considerable portion of the ring signals will be consumed by the element 32, T and 1 and the remaining ring signals passing through the LED and entering the facsimile machine may become too weak to carry out their normal task (to light up the LED and to change the facsimile machine from ON-HOOK to OFF-HOOK).

When the user picks up the handpiece, the connection between the central office and facsimile machine is built, and the potential at the terminals JR1, JT1 falls to 6–7 volts. (It is not until the transmission is over that the potential recovers to 48 V.) Though at this moment, the circuit can be supplied via the cable, the 6–7 V voltage is only enough to activate the LED (as it is in the first embodiment), but far from sufficient to drive the more difficult elements 32, T and 1. Therefore, we once more understand that the capacitor C3 is indispensable in the second embodiment.

The operation of the second embodiment in various conditions is stated in the following.

A. RECEPTION OF INFORMATION

When ring signals arrives, the polarity of terminals JR1, JT1 is inverted. The ring signals can travel from JT1 via points P1, P2 to point P3. From here they can either travel via the auxiliary circuit D3, R3 and directly applied to the base of the transistor T to actuate it, or travel from point P4 via one of the following three routes to point P5: firstly, via resistor R1, LED 31 and diode D41'; secondly, via resistor R2, and diode D41'; and thirdly, simply via capacitor C2. Then the ring signals enter the facsimile machine from terminal JT2 and leaves the facsimile machine from terminal JR2 and return to the terminal JR1, thus finishing a loop. As the ring signals pass through LED 31, the LED 31 and therefore the elements 32, T are activated. Thus a current can flow from the positive electrode capacitor C3 through the coil 11 and the transistor and back to its negative electrode. Therefore the relay 1 is activated. Now a current can be tapped from the secondary winding of transformer 6 through the tapping/rectifying circuit 2' to supply the elements 32, T and 1. The current flows from the secondary winding of transformer 6 via diode D61 or diode D62 via a diode D5, coil 11 and then either via CdS photoresistor 32 and be applied to the base of transistor C or through the CE path of the transistor C and back to the secondary winding. Therefore it is obvious that the capacitor C3 only provide the current in the early stage of a working cycle.

When the facsimile machine receive the ring signals, it immediately changes from ON-HOOK to OFF-HOOK. Thus the central office will buil its connection with the local facsimile machine. Now the potential at the terminals JR1, JT1 falls to 6–7 V, and the polarity thereof recovers to JR1 (+) and JT1 (−). The 6–7 V voltage is still enough to keep the LED 31 in active state. The current (and alos the information) travels from JR1 to JR2 and enters the facsimile machine, and then travels through JT2, P5 to point P6 either via diode D42' or via capacitor C2 and diode D44', and then travels from point 7 to point 8 either via R1 and LED 31 or via resistor R2, and finally travels via diode D34' and points P4, P3, P2 and P1 back to terminal JT1.

Thus the LED is kept active during the reception of information.

When the reception of information is over, the potential at the terminals JR1, JT1 recovers to 48 V, and the connection between the central office and the facsimile machine is broken, thus no current flows through the LED 31. As a result, the elements 32 and T become inactive. But the relay 1 is switched off 40–50 seconds later because of the discharging of the capacitor C1.

B. TRANSMISSION OF INFORMATION

When the user picks up the handpiece, the connection between the central office and the local fascimile machine is immediately built, and the LED can be supplied via the cable. Meanwhile, the voltage at the terminals JR1, JT1 falls to 6–7 V. The activation of the LED results the activation of the CdS photoresistor 32, thus a current can flow from the capacitor C3 through the coil 11 and the CdS photoresistor resistor 32 to the base of transistor T to actuate the transistor, and then directly through the coil 11 and the CE path of the transistor T back to the capacitor C3, thus starting the AC power supply. Once the AC power supply is started, a current can be tapped from the transformer 6 via the tappin/rectifying circuit 2' to drive these elements 32, T and 1.

The path of the current that energizes the LED is the same as the route which information travels during the aforesaid reception of the information.

After the user has dialed the fax number of the remote facsimile machine, if the latter is not busy, information can be transmitted from JR2 via the same route as the aforesaid path to JT1, and then to the remote facsimile machine.

When the trasmission of information is over, the potential at the terminals JR1, JT1 recovers to 48 V, and the connection between the central office and the facsimile machine is broken, thus no current flows through the LED 31. As a result, the elements 32 and T become inactive. But the relay 1 becomes inactive 40–50 seconds later because of the capacitor C1.

C. USED AS A PHOTOCOPIER

Like the first embodiment, the second embodiment also has a normally-open switch SW1 for like purpose. When the switch SW1 is switched to its close position, a current can flow from the capacitor C3 through the coil 11 and switch SW1 without passing the transistor T, thus the AC power supply can be started.

The major functions of the second embodiment has been described hereinbefore. The functions of its some minor elements will be explained in the following.

To prevent the capacitor C3 from being charged too rapidly, a resistor R4 is provided. The resistor R4 also prevent ring signals to be absorbed by the capacitor C3.

To prevent the probable fluctuation of the tapped current from causing the pulsative ON/OFF of the relay, a capacitor C4 is provided to absorb the peaks. Since the current passing through the capacitor C4 is rectified DC current, it must have definite polarity, and is preferably and electrolytic capacitor.

The second embodiment has been explained in details. The third embodiment will be described hereinafter.

Figure 5:
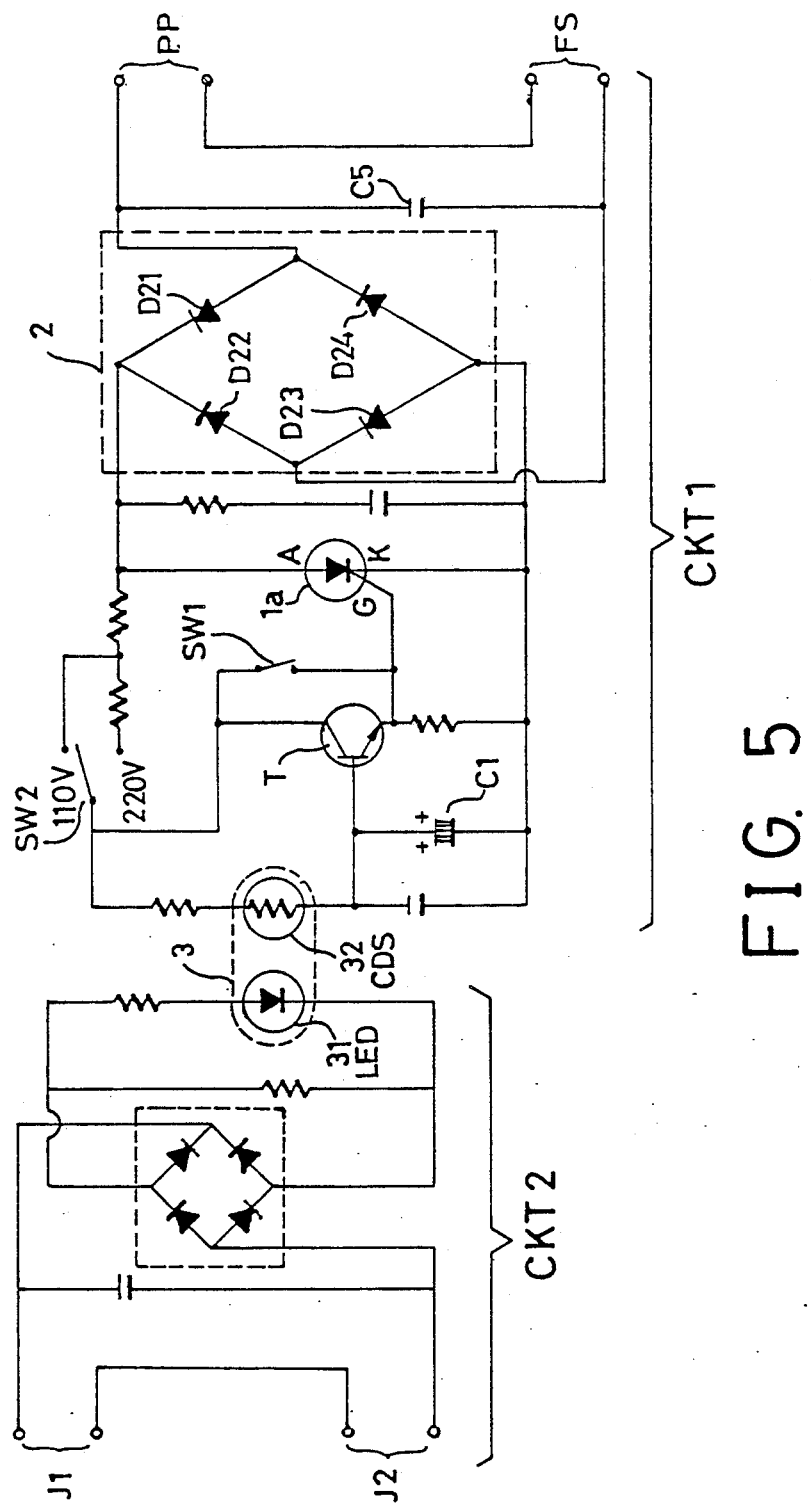
FIG. 5 is a circuit diagram of a third embodiment of this invention.

Referring to FIG. 5, the third embodiment differs with the first embodiment only in that it uses a SCR instead of relay to control the AC power supply. Since here the cable-side circuit CKT2 is exactly the same as the cable-side circuit CKT2 of the first embodiment in FIG. 3, the details thereof are not repeated. Like the first embodiment, the third embodiment also comprises a transistor T, an optical coupler 3 consisting of a LED 31 and a CdS photoresistor, a tapping/rectifying circuit 2, two switches SW1 and SW2, and a capacitor C1. The emitter of the transistor T is connected to the gate of the SCR 1a so that when the transistor is activated, a current can pass through the CE path of the transistor and be applied to the gate of the SCR 1a, thus activating the latter to allow the AC power to the supplied to the facsimile machine.

The various functions of the third embodiment are substantially the same as the first embodiment, thus their detailed description is not necessary.

However, it is to be noted that the capacitor C5 serves only for filtration purpose. Although it is well known to an electronic specialist that a capacitor stops DC and allows AC to pass through, if the capacitance is very small, a capacitor does not allow an AC current to pass through. Here the capacitance of capacitor C5 is so small that it allows no AC current to pass through.

The RC circuit connected in series with the SCR is an ordinary protective meansure for thyristors.

Apart from a facsimile machine, a computer which is on line with the central office can also utilize the present invention for like purpose. It is noteworthy that when a computer is on line with the central office, its signal I/O jack must be connected to an interface (a so-called "modem") which is connected to a cable. When the present invention is used for such a computer, the cable is connected to the jack J1 of this invention, and the cable line of the interface is connected to the jack J2. Since both the computer and the interface need and AC power to drive them, a socket extender which provides two sockets can be inserted into the socket FS, then the plugs of the power lines of the computer and the interface are recpectively inserted into the two sockets of the socket extender.

When a computer is connected on line with the central office, it is also provided with a telephone set (or the like) to dial the fax number of a remote station. Therefore in the case of transmission of information, when the user picks up the handpiece (or gives an equivalent instruction via the keyboard) the interface will build up the connection between the computer and the central office. In the case of reception, it is also the interface that build up this connection when receiving ring signals. Thus, when used for a computer, the function of this device is substantially the same as when it is used for a facsimile machine.

I claim:

1. A power-saving device for a cable-information receiving/transmitting apparatus, said cable-apparatus having an AC power line to connect to an AC-power source and a cable-terminal set to connect to said central office, said power-saving device having a first AC-terminal set to connect with said AC-power source, a second AC-terminal set to connect with said AC power line of said apparatus, a first cable-terminal set to connect with a cable from a central office, and a second cable-terminal set to connect with said cable-terminal set of said apparatus, said device starting the AC-power supply of said AC-power source to said apparatus in any of the following states:

a. when ring signal arrive from said central office via said cable;

b. when the handpiece of a telephone set attached to said apparatus is picked up;

and cut off the AC-power supply of said AC-power source to said apparatus after a predetermined time in any of the following states:

c. when a reception of information from said central office via said cable by said apparatus is over;

d. when a transmission of information from said apparatus via said cable to said central office is over;

said device being characterized by that it further comprises the following components:

an AC-controlling means which has an AC-input end connected to said AC-power source, an AC-output end connected to said AC power line of said apparatus and a controlling portion, said AC-controlling means only allowing and AC current to be supplied from said AC source via said AC-input end and said AC-output end to said apparatus when said AC-controlling means is in activated state, said AC-controlling means being activated when a current is applied to said controlling portion;

a transistor, of which the CE path is connected to said controlling portion of said AC-controlling means such that when a current passes through the CE path of said transistor, said AC-controlling means is activated;

an optical coupler comprising a photoemitter and a photoreceiver, wherein said photoreceiver has two terminals which are respectively connected to the collector and the base of said transistor, so that when said photoemitter is actuated, said photoreceiver is activated to become conductive, thus activating said transistor;

a tapping/rectifying circuit provided between the AC-input end of said AC-controlling means and said AC-power source to tap a current from said AC-power source and to rectify the tapped current and supply the tapped and rectified current to said photoreceiver, the base of said transistor, the CE path of said transistor and the controlling portion of said AC-controlling element;

said component being so connected that said photoemitter is inaccessible by any current derived from said AC-power source and only accessible by a current from said cable.

2. The device according to claim 1, wherein said AC-controlling means is a relay, and said controlling portion is a coil thereof.

3. The device according claim 1, wherein said AC-controlling means is a thyristor, and said controlling portion is the gate thereof.

4. The device according to claim 1, wherein said photoemitter is a LED.

5. The device according to claim 1, wherein said photoreceiver is a CdS photoresistor.

6. The device according to claim 5, further comprising a rectifying circuit between said cable and said LED to ensure a current from said cable to flow in the forward direction of said LED.

7. The device according to claim 1, further comprising a capacitor which starts to discharge to keep said AC-controlling means in active state for a predetermined time after said photo-receiver becomes inactive.

8. The device according to claim 1, further comprising:

a transformer, of which the primary winding is respectively in serial connection with the AC-input end and the AC-output end of said AC-controlling means, and of which the secondary winding is connected with said tapping/rectifying circuit;

a further capacitor of definite polarity, which is chargeable by a current from said cable and connected to said controlling portion of said AC-controlling means and the CE route of said transistor;

a further rectifying circuit to ensure a current to flow only toward the positive electrode of said further capacitor.

9. The device according to claim 1, further comprising a normally-open switch which is connected in parallel with the CE path of said transistor.

* * * * *